United States Patent [19]

Frigato

[11] 4,091,834
[45] May 30, 1978

[54] APPARATUS FOR AUTOMATICALLY PREPARING SOLUTION OF CONTROLLED CONCENTRATION

[75] Inventor: Giovanni Frigato, Medolla, Italy
[73] Assignee: Sandoz Ltd., Basel, Switzerland
[21] Appl. No.: 740,789
[22] Filed: Nov. 11, 1976
[30] Foreign Application Priority Data
 Nov. 14, 1975 Italy .................... 69808/75
[51] Int. Cl.$^2$ .................. G05D 9/12; G05D 11/08; G05D 11/13
[52] U.S. Cl. ................................ 137/93
[58] Field of Search ...................... 137/5, 93
[56] References Cited
 U.S. PATENT DOCUMENTS

| | | | |
|---|---|---|---|
| 3,352,779 | 11/1967 | Austin et al. | 137/93 X |
| 3,376,883 | 4/1968 | Douty et al. | 137/93 X |
| 3,605,783 | 9/1971 | Pecker et al. | 137/93 |

*Primary Examiner*—Robert G. Nilson
*Attorney, Agent, or Firm*—Gerald D. Sharkin; Robert S. Honor; Walter F. Jewell

[57] ABSTRACT

The invention concerns a novel apparatus for automatically preparing a solution of controlled salt concentration, which comprises a mixer container in which preparation of the solution may take place, a regulator device for regulating supply of components of the solution to the mixer container, a level detector for detecting the level of solution in the mixer container in the vicinity of a prescribed primary level, a concentration probe for detecting concentration of salts in the solution, and a control device connected to receive electronic signals transmitted from said level detector and said concentration probe for producing a control output signal to control said regulator device, whereby the level of solution in the container is maintained in the vicinity of said prescribed primary level and the concentration of salts in the solution is maintained in the region of a predetermined value.

10 Claims, 4 Drawing Figures

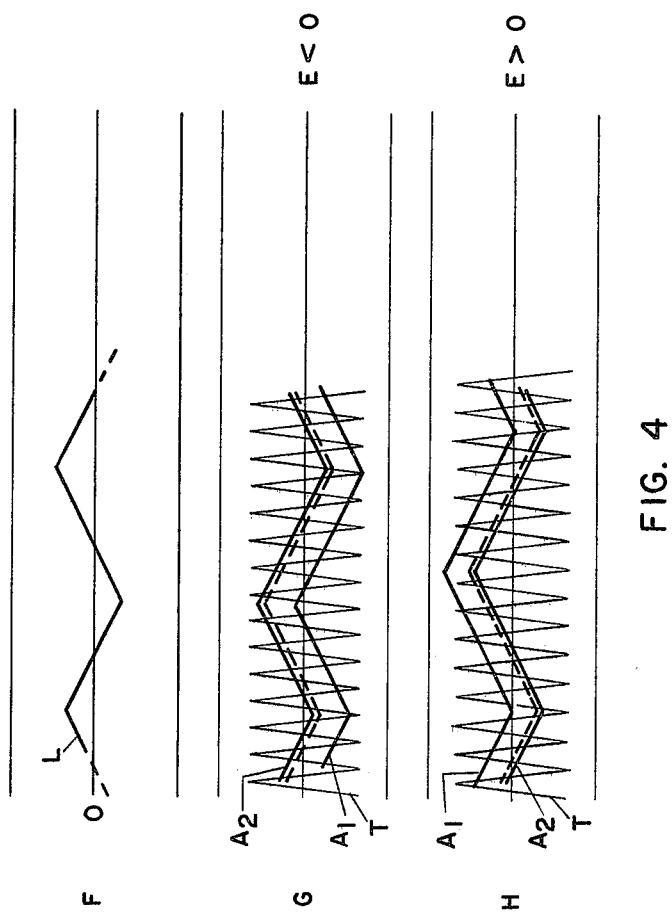

APPARATUS FOR AUTOMATICALLY PREPARING SOLUTION OF CONTROLLED CONCENTRATION

This invention relates to an apparatus for automatically preparing a solution of controlled concentration.

The apparatus is particularly suitable for the preparation of dialysis liquid. For this specific purpose, in which a concentrate is mixed with water in a volumetric ratio 1:30 to 1:35, known types of apparatus for example comprise two volumetric pumps to supply water and concentrate to a mixer. Two such pumps are driven simultaneously by a main motor whose speed can be adjusted to vary the amount of liquid obtained. By means of a conductivity probe mounted at the outlet of the mixer, which compares its own output signal with a reference signal which is a function of the desired concentration, the stroke length of the piston in the pump for the concentrate can be varied to adjust the concentration of the liquid. For various reasons, equipment of this type does not function satisfactorily. For example, the volumetric ratio of the pumps varies widely to permit adjustment in the rate of flow of the liquid at the outlet from 200 cc/min. to 1000 cc/min., which places a heavy strain on the working capacity of the main motor. The flow at the outlet pulsates, so that a damper needs to be fitted which, at 200 cc/min., must be of considerable dimension. Further, the pressure of the inflowing water may reach dangerous levels, for which reason a safety valve is necessary, with a counterpressure valve in the water supply line to regulate flow and hence conductivity. Additionally, if complete mixing is desired the residence time in the mixer is too long, which causes the loop for regulating the concentration either to oscillate or to respond very slowly. Such an apparatus can therefore be operated only with manual control with the loop open, with fixed rates of flow at the outlet not lower than 500 cc/min. Such apparatus is moreover relatively expensive to construct.

The purpose of the present invention is therefore to provide an apparatus for automatically preparing a solution with continuous control and monitoring of the concentration and flow. The apparatus does not suffer from the disadvantages involved in adjusting the rate of flow and water can be supplied at a limited pressure without pulsating flow. This allows for thorough mixing of concentrate and water by means of a regulating loop for regulating the concentration, which functions with notable rapidity.

According to the invention, there is provided an apparatus for automatically preparing a solution of controlled salt concentration, which comprises a mixer container in which preparation of the solution may take place, a regulator device for regulating supply of components of the solution to the mixer container, a level detector for detecting the level of solution in the mixer container in the vicinity of a prescribed primary level, a concentration probe for detecting concentration of salts in the solution, and a control device connected to receive electronic signals transmitted from said level detector and said concentration probe for producing a control output signal to control said regulator device, whereby the level of solution in the container is maintained in the vicinity of said prescribed primary level and the concentration of salts in the solution is maintained in the region of a predetermined value.

Further features of the invention will be understood from the following description of an exemplary embodiment of an apparatus in accordance with the invention. This description is made with reference to the accompanying drawings, in which:

FIGS. 3 and 4 are diagrammatic representations of signals emitted by the command and monitoring block of FIG. 2.

Figure 1:
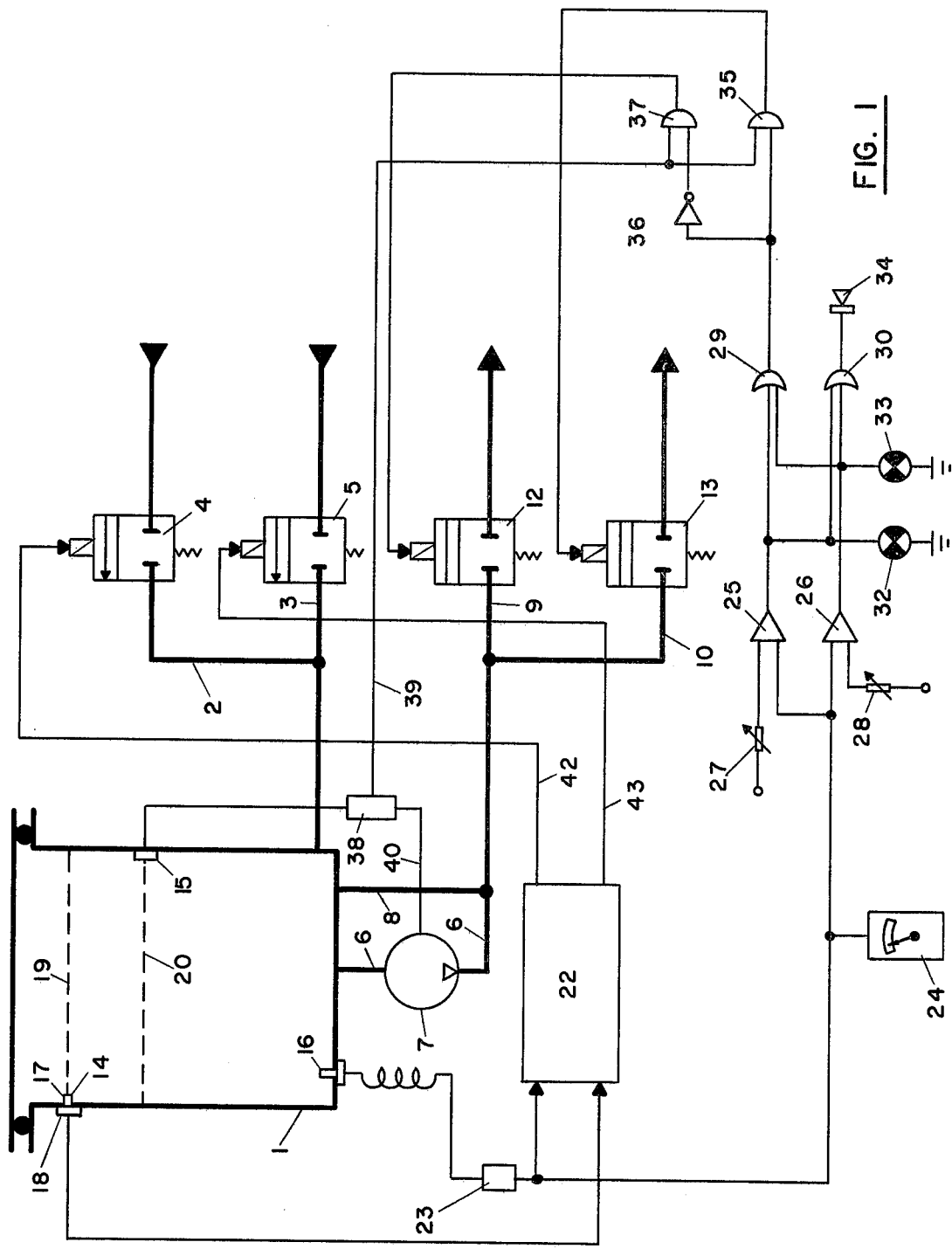
FIG. 1 is a diagrammatic illustration of the hydraulic and electronic principles involved in the apparatus of this invention.

Referring to FIG. 1 of the drawings the apparatus comprises a mixing container 1 of about 4 liters capacity with inlet pipes 2 and 3 for respectively supplying concentrate and water. In pipes 2 and 3 respectively are fitted two electric valves 4 and 5. A pipe 6 with including a pump 7 leads from the vessel 1 and from it branch off successively a recirculation pipe 8 which returns to the container 1 and two pipes 9 and 10 for delivery and drainage respectively. In pipes 9 and 10 respectively are fitted two electric valves 12 and 13.

In the container 1 are mounted two level detectors 14 and 15 of known type and a probe 16 which measures the conductivity and hence the concentration of the solution in the vessel. The level detector 14 may be for example be of the type consisting of a small magnet 17 connected to a float acting in conjunction with a fixed detector 18 and may be constructed to signal a positive or negative potential difference (see FIG. 2). In such construction the magnet 17 moves to a point either above or below a level 19 which represents the maximum normal level of liquid in the container 1. In contrast, the level detector 15 is of the type which emits a signal when the liquid reaches a level higher than a minimum level 20, which is lower than the level 19.

The probe 16 may conveniently be of the type which emits a signal whose frequency is proportional to the conductivity value and hence to the concentration of the liquid, with compensation for the temperature being built in.

The output of the level detector 14 is connected to a command and monitoring block 22. The output of the probe 16 is connected to a converter block 23. The outputs of the block 23 lead to a block 22, to an indicating instrument 24, and to two threshold comparators 25 and 26. To the other input points of the comparators 25 and 26 are connected to the inputs of two "OR" circuits 29 and 30, and these are connected respectively to earthed signalling lamps 32 and 33. The output of the "OR" circuit 30 is connected to an acoustic signaller 34. The output of the "OR" circuit 29 leads to an "AND" gate 35 and to an inverter 36, whose output is connected to an "AND" gate 37. A signal from a block 38 is transmitted to the second inputs of the "AND" gates 35 and 37. This block 38, which receives a signal 39, at logical level, for the gates 35 and 37, and a command signal 40 for the pump 7. The outputs of the "AND" gates 35 and 37 are connected to command respectively the electric valves 13 and 12. The block 22 sends two output signals 42 and 43 which respectively command the electric valves 4 and 5.

Figure 2:
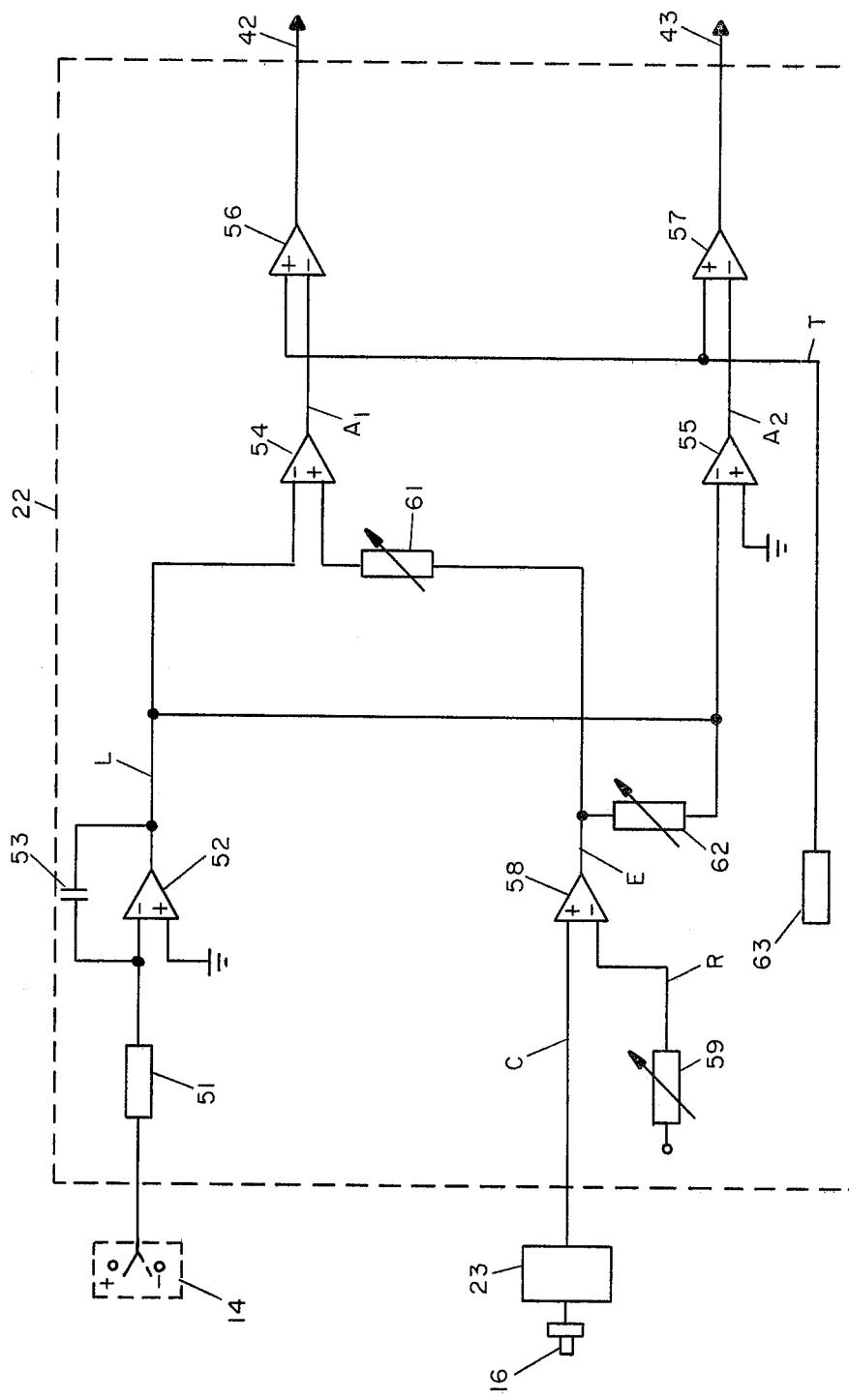
FIG. 2 is a diagrammatic illustration of the electronic circuitry of the command and monitoring block shown in the apparatus illustrated in FIG. 1.

Referring now to FIG. 2, block 22 comprises a resistor 51, to which is transmitted the signal from the level detector 14 and which is connected to the inverting input of a difference amplifier 52 acting as integrator, the non-inverting input of which is earthed. Between the inverting input and the outputs is connected a condenser 53. The output of the amplifier 52 leads to the inverting input of two difference amplifiers 54 and 55, the outputs of which are connected respectively to the negative inputs of two threshold comparators 56 and 57.

The output of the converter block 23 is connected to the non-inverting input of a difference amplifier 58, the inverting input of which is connected to receive an adjustable signal transmitted through a variable resistor 59. The output of the amplifier 58 is connected through a variable resistor 61 to the non-inverting input of the amplifier 54, and through a variable resistor 62 to the inverting input of the amplifier 55.

From the output of a generator 63, a delta signal is relayed to the non-inverting inputs of the comparators 56 and 57, while the outputs of these comparators respectively emit signals 42 and 43 commanding the electric valves 4 and 5.

The letters appearing in the diagram denote:
L: the hump repeater signal from the output of the amplifier 52,
C: the signal proportional to the conductivity of the liquid,
R: the signal of the conductivity reference value,
E: the signal reporting an error in conductivity,
$A_1$: the output of the amplifier 54,
$A_2$: the output of the amplifier 55, and
T: the delta reference signal.

From the circuit diagram shown in FIG. 2, it will be noted that if the signals 42 and 43 at the outputs of the comparators 56 and 57 are actuated, the electric valves 4 and 5 open to admit concentrate and water, provided that the signal T is greater than the signal $A_1$ and $A_2$. The period of the signal T is about 1 second, and that of signal L, 30 or 40 seconds. The signal T is maintained between +12 V and −12 V, while the signals $A_1$ and $A_2$ are free to reach the saturation levels which, at ± 15 V current supply, are about +14 V and −13 V. At these two extreme levels, the connected electric valves 4 and 5 invariably remain closed or open. Between these two levels the electric valves 4 and 5 open for a period of time proportional to the values of $A_1$ and $A_2$. When $A_1$ and $A_2$ are zero, the open time of the valves 4 and 5 is obviously one half of the total time. The variable signals $A_1$ and $A_2$ and the delta signal T determine in the comparators 56 and 57, within fixed levels, the open and closed times of the electric valves 4 and 5. They are given by:

$$A_1 = -L + K_1 E$$
$$A_2 = -L - K_2 E \qquad (1)$$

where $K_1$ and $K_2$ are proportionality constants determined by the resistors 61 and 62.

Operation of an apparatus as described above will now be described with reference to FIGS. 3 and 4, which serve as illustration only and do not indicate the signals on the proper scale.

The initial steps for reaching a condition in which the apparatus is set for operation will now be described.

As the supply of liquid flows into the container from the pipe 9, the magnet 17 of the level detector 14 continuously oscillates in the region of the level 19. These oscillating movements of the magnet 17, and of the liquid level in the vessel 1, are determined by the command and monitoring block 22, which actuates the electric valves 4 and 5 and regulates the time that they maintained fairly constant at about the maximum level 19, and the rate of flow of the liquid varied as necessary.

Assuming that the effective concentration of the liquid is equal to the desired value, so that signal C equals signal R, then E = 0, which in accordance with (1) gives $$A_1 - A_2 = -L \qquad (2)$$

Figure 3:
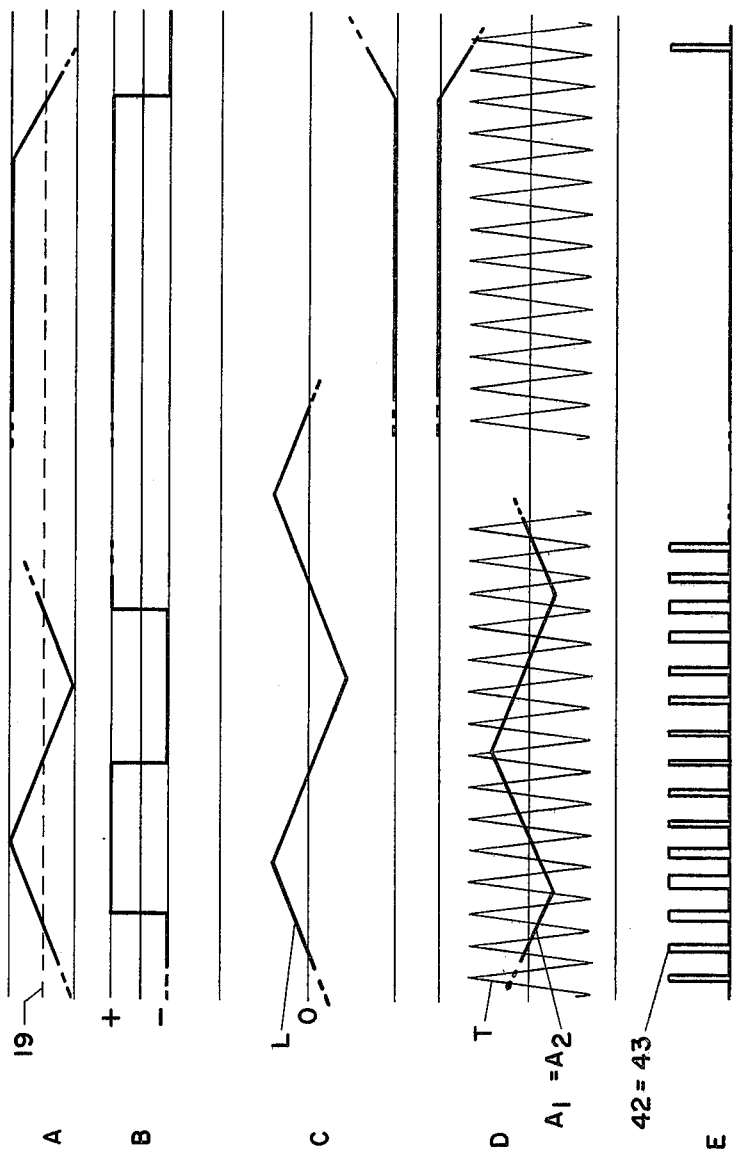

In FIG. 3, A shows the magnet 17 signal as a function of time, which oscillates about the maximum normal level 19. When the magnet 17 is lower than the level 19, the negative terminal of the level detector 14 is connected to the inverting input of the amplifier 52 (B indicates the signal from the output of the level detector 14). Accordingly the signal L increases while, as given by (2), the signals $A_1$ and $A_2$ of (2) are constant or decrease. Due to the signals $A_1$ and $A_2$ and the delta signal T, the duration of the signal 42 and 43 grows progressively longer, thereby increasing the amounts of water and concentrate entering the vessel 1 so that the liquid level steadily rises.

Once level 19 is exceeded, the positive terminal of the level detector 14 is connected to the inverting input of the amplifier 52. The signal L then descreases while, in accordance with equation (2), the signals $A_1$ and $A_2$ remain constant or increase. The signals 42 and 43 thereby grow progressively shorter in duration, causing the amounts of water and concentrate which flow into the container 1 to be reduced so that the liquid level rises more slowly, then stops, and afterwards falls.

When the liquid level, and with it the magnet 17, again falls below the level 19, the negative terminal of the level detector 14 is connected anew to the inverting input of the amplifier 52. The L signal is then amplified while signals $A_1$ and $A_2$ remain constant or diminish. The duration of the signals 42 and 43 grows progressively longer, causing the liquid level to fall more slowly at first and then to stop, after which it again rises until it once more rises above the level 19, when the described phases of the first cycle are repeated.

Thus, in practice, the liquid level constantly fluctuates by about 10 mm about the maximum normal level 19. In the apparatus, this in effect amounts to a substantially constant level of liquid, also as regards variations in the amount of liquid delivered. If however the delivery of liquid ceases, the level in the vessel gradually rises (FIG. 3), and consequently the signal L gradually diminishes until it fades out. This amplifies the signals $A_1$ and $A_2$ to their maximum positive value, which is higher than the maximum value of the signal T, whereby the signals 42 and 43 remain at zero and the electric valves 4 and 5 remain closed. In these conditions, when no further liquid is being delivered, the vessel 1 remains full of liquid at the desired concentration, ready to meet a further demand for prepared liquid.

When delivery is resumed, the liquid level begins to fall until its fall below level 19, when the signal L is amplified, signals $A_1$ and $A_2$ diminish, and signals 42 and 43 grow gradually longer, thereby setting in motion a further flow of water and concentrate in accordance with the described phases of operation.

Supposing that an error occurs in the concentration of the liquid, then obviously the signal E will be other than zero. This changes the signals $A_1$ and $A_2$, and accordingly the times that the electric valves 4 and 5 remain open, by a factor proportional to E, obviously of opposite sign. The concentration of the solution is thus adjusted to the desired value.

Again, supposing too much concentrate has been supplied, FIG. 2 shows that $C > R$ which makes $E > 0$. The equations (1) indicates that $A_1$ is greater and $A_2$ less than the value which should prevail in exact concentration conditions as represented by the broken line (FIG. 4). This signifies that the electric valve 4 for the concentrate has been open for shorter periods of time and the valve 5 for the water for longer periods, as is in fact necessary for further dilution of the concentrate.

If on the other hand there is not enough concentrate present, then $C > R$ and accordingly $E > 0$. From (I) it follows that $A_1$ is too low and $A_2$ too high (FIG. 4) with respect to the conditions for exact concentration, showing that the electric valve 4 for the concentrate has been open for longer times and valve 5 for the water for shorter times than necessary.

In order that correction of the concentration may be entrusted principally to the electric valve 4 for the concentrate, the proportionality constants $K_1$ and $K_2$ in (1) are different from each other. Convenient values are set such that $K_1 = 5K_2$ and makes $K_1 E$ equal to the maximum value of L when $E = 1.5\%$. This means that adjustments in the open times of the electric valve 5 for the water serve in practice solely to correct a positive error in the concentration in the direction of the maximum level, and that, given a 1.5% concentration error, with open and closed times theoretically equal to those for the exact concentration, the valve 4 for the concentrate will remain completely closed.

The curves in FIG. 4 are based on the assumption that the concentration error remains constant; in practice it tends to approximate zero, for which reason the continuously drawn curves representing the signals $A_1$ and $A_2$ coincide more and more closely with the broken line referring to the conditions of exact concentration.

Preparation phases for preparing the apparatus to obtain such in its operating condition will now be described.

The container 1 being empty, the level detector 15 determines through the block 38 the level of the signal 39, which closes the outputs of the gates 35 and 37, and in consequence the electric valves 12 and 13 located in the supply and drainage pipes 9 and 10 remain closed. At the same time, the magnet 17 of the level detector 14 being below the level 19, the signal L is amplified to the maximum positive value and the signals $A_1$ and $A_2$ adjust to the maximum negative value, which is lower than the minimum value of the delta signal T. The signals 42 and 43 are then continuous, and the electric valves 4 and 5 are fully open to allow water and concentrate to enter the vessel 1 at the maximum rate of flow. When the liquid in the vessel 1 rises above the level 20, the level detector 15 emits a signal to the output of the block 38 which emits the signal 40 to activate the pump 7. This initiates recirculation of the liquid through the pipe 8 into the container 1 and sets off the signal 39 at a different level which activates a signal at the output of one of the gates 37 or 35, according to the value of the concentration. The potential signal at the output of the block 23 is transmitted to the instrument 24 which records the concentration value visually and is connected to the two comparators 25 and 26. The upper and lower tolerance limits of the concentration value are controlled by the two resistors 27 and 28, which receive a signal from the output of one of the threshold comparators 25 and 26 when the concentration value falls below the lower limit or rises above the upper limit respectively. In such conditions of erroneous concentration, the lamp 32 or 33 lights up, the signaller 34 sounds an acoustic alarm, and a signal in the circuit 29, upon simultaneous emission of the signal 39 emits a signal to the gate 35 which opens the electric valve 13 of the drainage pipe 10.

If however the concentration is correct, the signal at the output of the circuit 29 is inoperative, so that the electric valve 13 stays closed. The inverter 36 then emits a signal to the gate 37, which, through the simultaneous emission of the signal 39, triggers off a signal which opens the electric valve 12 of the supply pipe 9.

Therefore, when the liquid level in the container 1 exceeds the level 20, the electric valve 12 or 13 of the supply or drainage pipe opens, dependent on whether the concentration is within the prescribed limits or beyond these limits.

Generally, the concentration in the container 1 is insufficient when the level 20 is reached in the first filling cycle. Consequently, the electric valve 13 in the drainage pipe 10 opens, and if the level 19 has been exceeded, the electric valves 4 and 5 close temporarily until, primarily through the action of the electric valve 4 in the concentrate pipe 2, the required concentration is attained.

The apparatus of the present invention, therefore possesses numerous advantages. Above all it provides for a supply of liquid at a rate of flow which is variable within wide limits, the concentration value of which remains substantially within the prescribed tolerance limits. The provision of the container 1, in which the concentration of all of the liquid it holds is controlled by the probe 16, eliminates problems with pulsating flow at the outlet, and there are no interfering effects on the rate of flow at the outlet or on the conductivity as a result of pressure differences of inflowing water.

The loop for the continuous control and monitoring of the concentration and rate of flow functions remarkably rapidly, and as a result the liquid level in the vessel remains in the vicinity of the level 19, with fluctuations over a range of only 10 mm. This is accomplished by the action which adjusts the open and closed times of the electric valves 4 and 5, which is controlled by the level detector 14 which controls the level of the signals $A_1$ and $A_2$ and thus ensures that the concentration value never deviates by more than 1% from the desired value, and also by the action of the probe 16 which, on encountering a prescribed concentration value, corrects the level of the signals $A_1$ and $A_2$. The adjustable resistors 61 and 62 permit the values of the correction constants $K_1$ and $K_2$ in (1) to be calibrated as desired, in order to obtain optimum values from the point of view of stability and response time.

In order to maintain the conductivity of the liquid in the container 1 within prescribed limits with minimal deviation, it can be useful to fit a pressure regulator on the water supply pipe 3 and an adjustable choke on the concentrate supply line 2. In this case, prior calibration of the choke is necessary. Together with the action of the block 22, this suppresses flow until the desired concentration value is reached. This rough means of regulation is thereby refined and the action of the block 22 fully retained.

What I claim is:

1. An apparatus for automatically preparing a solution of controlled salt concentration, which comprises a mixer container in which preparation of the solution may take place, a regulator device for regulating supply of components of the solution to the mixer container, a level detector for detecting the level of solution in the mixer container in the vicinity of a prescribed primary level, a concentration probe for detecting concentration of salts in the solution, and a control device connected to receive electronic signals transmitted from said level detector and said concentration probe for producing a control output signal to control said regulator device, the control device comprising a first element for emitting a first level signal as a function of the signal from the level detector, and at least two secondary elements for associating said first level signal with a second reference level signal and for emitting a third control signal for controlling the regulator device, whereby the level of solution in the container is maintained in the vicinity of said prescribed primary level and the concentration of salts in the solution is maintained in the region of a predetermined value.

2. An apparatus according to claim 1, in which the control device comprises a third element for comparing the signal from the concentration probe with a concentration reference signal which is a function of the predetermined concentration value, and which emits a fourth signal, and fourth elements for emitting fifth signals as functions of said first level signal and said fourth signal, said fifth signals being attuned to said secondary elements so that they are associated with the said second reference level signal.

3. An apparatus according to claim 2, in which the regulator device comprises a pair of electric valves for admitting or impeding supply of components of the solution to the container, the said third control signal being for controlling opening and closing of the electric valves and their open and closed times as a function of the first level signal so as to maintain the level of the liquid in the container in the vicinity of the said primary level, and furthermore as a function of said fourth signal so as to maintain the concentration value of the solution in the region of the predetermined value.

4. An apparatus according to claim 3, in which said fifth signals are functions of said first level signal and said fourth signal with different proportionality constants relative to said fourth signal, whereby the variation in the open and closed times of the electric valves produced by variation of the fourth signal is substantially greater for one of the valves than for the other.

5. An apparatus according to claim 2, in which said third and fourth elements comprise difference amplifiers.

6. An apparatus according to claim 1 in which said first element comprises an integrator.

7. An apparatus according to claim 1, in which said secondary elements are threshold comparators, and in which the second reference level signal is in the form of a periodic delta signal.

8. An apparatus according to claim 1, in which the concentration probe is coupled to the control device through a converter block for converting potential to frequency whereby a signal having a frequency porportional to the conductivity of the solution may be transmitted.

9. An apparatus according to claim 1, in which the signal emitted by the concentration probe is attuned to two threshold comparators for controlling lower and upper limits of concentration of the solution, the outputs of said comparators being connected to alarm elements and also to gate devices for commanding opening of one or the other of at least two electric valves provided for controlling delivery and drainage of solution from the container.

10. An apparatus according to claim 9, in which a control signal in the case of consent is transmitted to the gate devices by a further level detector mounted in the said container at a second level which is lower than said primary level.

* * * * *